United States Patent
Lin et al.

(10) Patent No.: US 10,126,466 B2
(45) Date of Patent: Nov. 13, 2018

(54) SPATIALLY MULTIPLEXED DIELECTRIC METASURFACE OPTICAL ELEMENTS

(71) Applicants: The Board of Trustees of the Leland Stanford Junior University, Palo Alto, CA (US); TECHNION RESEARCH AND DEVELOPMENT FOUNDATION LIMITED, Haifa (IL); Florida Research Foundation, Inc., Orlando, FL (US)

(72) Inventors: Dianmin Lin, Los Altos, CA (US); Mark L. Brongersma, Menlo Park, CA (US); Erez Hasman, Hadera (IL); Pieter G. Kik, Orlando, FL (US); Aaron L. Holsteen, Stanford, CA (US)

(73) Assignees: The Board of Trustees of the Leland Stanford Junior University, Stanford, CA (US); Technion Research and Development Foundation Limited, Haifa (IL)

( * ) Notice: Subject to any disclaimer, the term of this patent is extended or adjusted under 35 U.S.C. 154(b) by 0 days.

(21) Appl. No.: 15/418,743

(22) Filed: Jan. 29, 2017

(65) Prior Publication Data
US 2017/0219739 A1 Aug. 3, 2017

Related U.S. Application Data

(60) Provisional application No. 62/288,935, filed on Jan. 29, 2016.

(51) Int. Cl.
*G02B 1/00* (2006.01)
*G02B 5/00* (2006.01)

(52) U.S. Cl.
CPC ............... *G02B 1/002* (2013.01); *G02B 1/00* (2013.01); *G02B 5/00* (2013.01); *G02B 5/008* (2013.01)

(58) Field of Classification Search
CPC .......... G02B 1/002; G02B 1/00; G02B 5/008; G02B 5/00
(Continued)

(56) References Cited

U.S. PATENT DOCUMENTS 9,507,064 B2 11/2016 Brongersma
2010/0313875 A1 12/2010 Kennedy
(Continued)

FOREIGN PATENT DOCUMENTS

WO WO2014039487 3/2014

OTHER PUBLICATIONS

Dianmin Lin, Pengyu Fan, Erez Hasman and Mark L. Brongersma, "Dielectric gradient metasurface optical elements", Jul. 18, 2014, Science, vol. 345, Issue 6194, pp. 298-302, http://science.sciencemag.org/content/345/6194/298.*
(Continued)

*Primary Examiner* — William R Alexander
(74) *Attorney, Agent, or Firm* — Lumen Patent Firm

(57) ABSTRACT

A multifunctional dielectric gradient metasurface optical device has a layer of nanoscale dielectric gradient metasurface optical antenna elements deposited on a substrate layer, arranged with spatially varying orientations, shapes, or sizes in the plane of the device such that the optical device has a spatially varying optical phase response capable of optical wavefront shaping. The spatially varying optical phase response is a spatial interleaving of multiple distinct phase profiles corresponding to multiple optical sub-elements, thereby providing multifunctional wavefront shaping in the single optical element.

7 Claims, 7 Drawing Sheets

(58) Field of Classification Search
USPC .......................................................... 359/244
See application file for complete search history.

(56) References Cited

U.S. PATENT DOCUMENTS

| | | | |
|---|---|---|---|
| 2013/0208332 A1 | 8/2013 | Yu | |
| 2014/0211298 A1* | 7/2014 | Sayyah | H01P 7/082 |
| | | | 359/298 |
| 2015/0040978 A1 | 2/2015 | Shalaev | |
| 2016/0025914 A1* | 1/2016 | Brongersma | G02B 1/002 |
| | | | 359/489.07 |
| 2016/0233971 A1* | 8/2016 | Fink | H01Q 3/46 |
| 2016/0306079 A1* | 10/2016 | Arbabi | G02B 5/0263 |
| 2016/0320531 A1* | 11/2016 | Kamali | G02B 5/0263 |
| 2017/0090221 A1* | 3/2017 | Atwater | G02F 1/0018 |
| 2017/0146806 A1* | 5/2017 | Lin | G02B 21/004 |

OTHER PUBLICATIONS

Decker et al., "High-efficiency light-wave control with all-dielectric optical Huygens' metasurfaces," May 20, 2014, arXiv:1405.5038v1 [physics.optics], accessed from http://arxiv.org/pdf/1405.5038v1.pdf.

Belardini et al., "Asymmetric Transmission and Anomalous Refraction in Metal Nanowires Metasurface," J. Europ. Opt. Soc. Rap. Public. 7, 12051 (2012).

Kildishev et al., "Planar Photonics with Metasurfaces," Science, Mar. 15, 2013: vol. 339 No. 6125.

Ni et al., "Ultra-thin, planar, Babinet-inverted plasmonic metalenses," Light: Science & Applications (2013) vol. 2.

Ni et al., "Broadband Light Bending with Plasmonic Nanoantennas," Science, vol. 335, Jan. 27, 2012, p. 427.

Bomzon et al., "Radially and azimuthally polarized beams generated by space-variant dielectric subwavelength gratings,", Optics Letters, Mar. 1, 2002, vol. 27, No. 5, p. 285.

Hasman et al., "Polarization dependent focusing lens by use of quantized Pancharatnam—Berry phase diffractive optics," Applied Physics Letters, vol. 82, No. 3, Jan. 20, 2003, p. 328.

Marrucci et al., "Pancharatnam-Berry phase optical elements for wavefront shaping in the visible domain: switchable helical modes generation," Appl Phys Lett (2006) vol. 88.

Pozar, D. M. & Targonski, S. D. A Shared-Aperture Dual-Band Dual-Polarized Microstrip Array. 49, 150-157 (2001).

LeCompte, M., Shi, S. Y. & Prather, D. W. Interleaved diffractive optical element design. Wave-Optical Syst. Eng. 4436, 115-122 (2001).

Veksler, D. et al. Multiple Wavefront Shaping by Metasurface Based on Mixed Random Antenna Groups. ACS Photonics 2, 661-667 (2015).

Haupt, R. L. Interleaved Thinned Linear Arrays. 53, 2858-2864 (2005).

Sayeed, A. M., Member, S. & Raghavan, V. Maximizing MIMO Capacity in Sparse Multipath With Reconfigurable Antenna Arrays. 1, 156-166 (2007).

Lager, I. E., Trampuz, C., Simeoni, M. & Ligthart, L. P. Interleaved Array Antennas for FMCW Radar Applications. IEEE Trans. Antennas Propag. 57, 2486-2490 (2009).

* cited by examiner

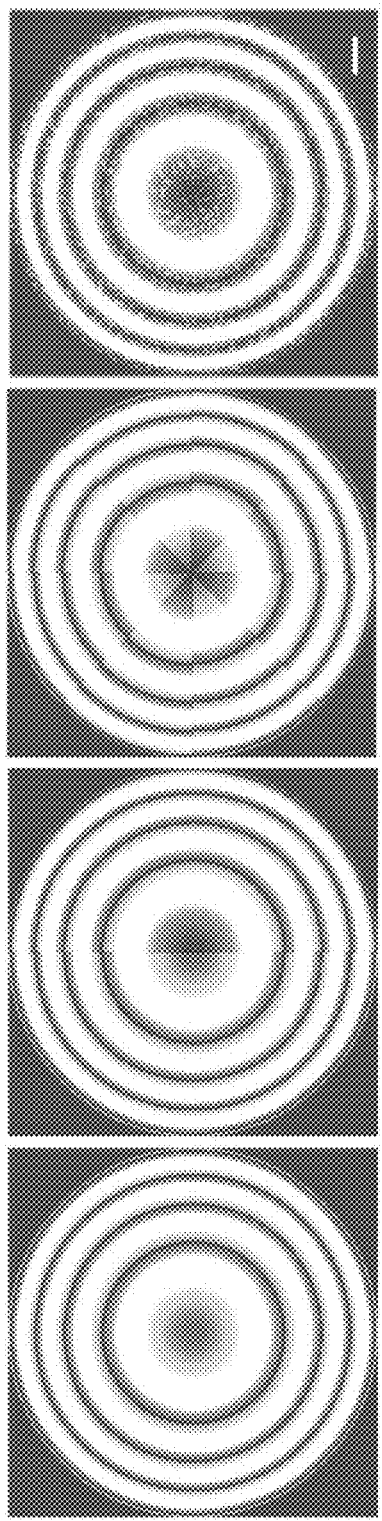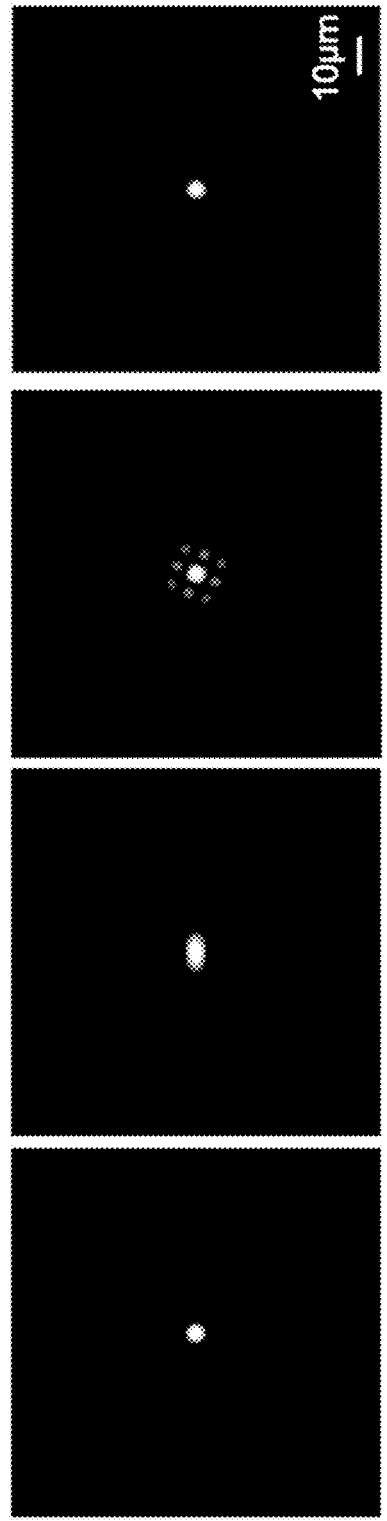

Fig. 6A  Fig. 6B
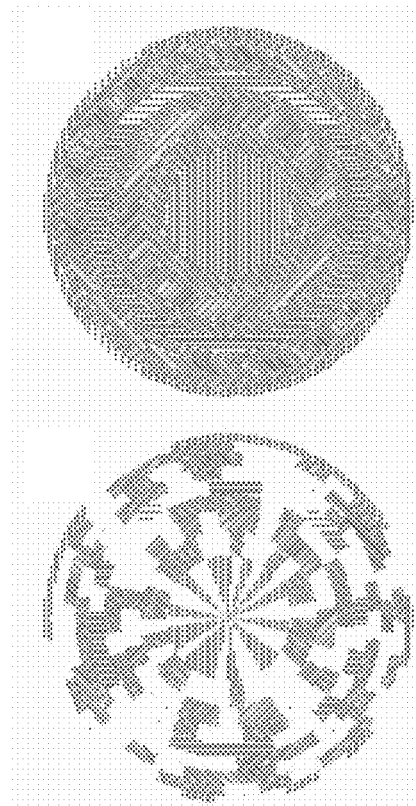
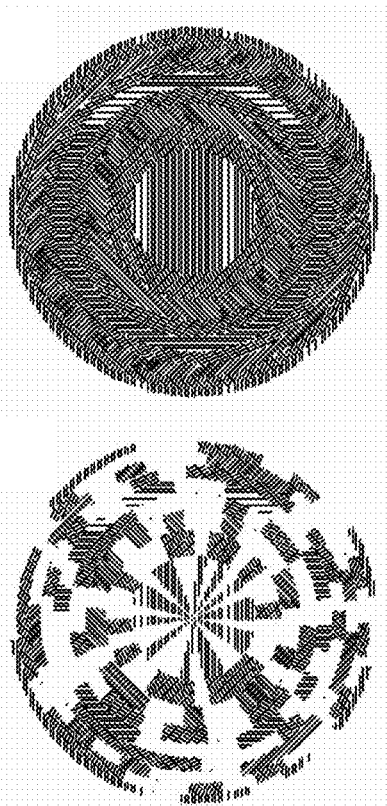
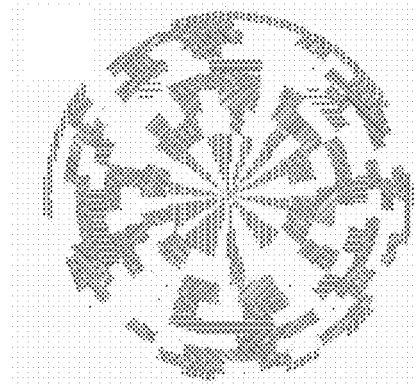
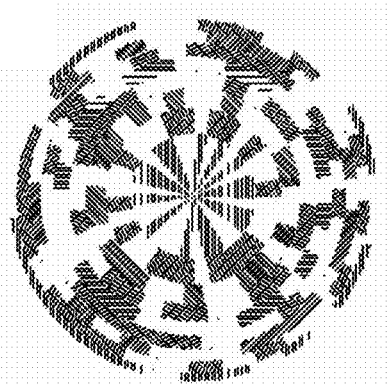
Fig. 6C  Fig. 6D
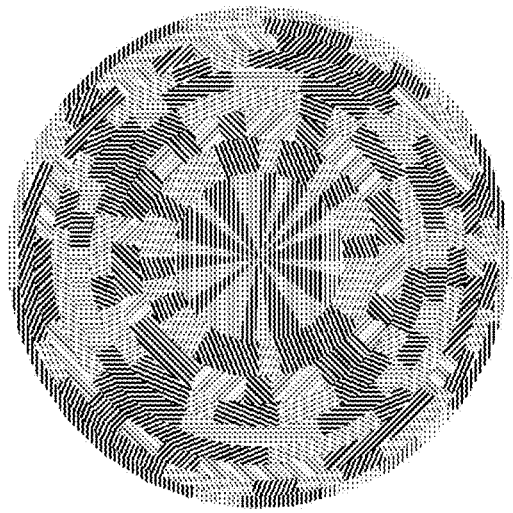
Fig. 6E

SPATIALLY MULTIPLEXED DIELECTRIC METASURFACE OPTICAL ELEMENTS

CROSS-REFERENCE TO RELATED APPLICATIONS

This application claims priority from U.S. Provisional Patent Application 62/288,935 filed Jan. 29, 2016, which is incorporated herein by reference.

FIELD OF THE INVENTION

The present invention relates generally to optical devices and methods. More specifically, it relates to integrated dielectric gradient metasurface optical elements (DGMOE).

BACKGROUND OF THE INVENTION

Nanophotonics has started to facilitate the replacement of bulky optical components by ultrathin, planar elements. The recent realization of metasurfaces, metamaterials of reduced dimensionality, is of particular relevance as it is opening up new opportunities to realize virtually flat optics. Metasurfaces can improve performances of conventional optical elements and facilitate the creation of entirely new functionalities, which were not explored yet. In particular, gradient metasurfaces are 2D optical elements capable of manipulating light by imparting local, space-variant phase-changes on an incident electromagnetic wave.

Various metasurfaces based on metallic and dielectric nano-antenna have been developed. Early work on metasurface based on V-shape antenna can shape the wavefront of one linear polarization. Recently, dielectric gradient metasurface optical elements (DGMOEs) capable of achieving high efficiencies in transmission mode in the visible has been demonstrated. Ultrathin gratings, lenses, and axicons have been demonstrated by patterning a 100-nm-thin Si layer into a dense arrangement of Si nanobeam-antennas, which serve as the ultrathin waveplates. By controlling the local orientation of the fast-axes of Si nanobeam-waveplates, the desired phase profile with 8-level discretization can be accomplished. It has been demonstrated that metasurfaces can do the optical wavefront shaping as well as conventional lens. Compared to other metasurfaces, DGMOE has the advantages of modulate phase in full a range while maintaining equal amplitude. Also DGMOE works for a broadband wavelength regime. See, for example, U.S. Pat. No. 9,507,064 entitled "Dielectric Metasurface Optical Elements" which is incorporated herein by reference. There remain certain limitations of the DGMOE technology in its current state. For example, metasurface lenses at visible wavelengths have been developed for imaging, but their use has been limited to single wavelength applications chiefly due to the large degree of chromatic aberration in the lens design. Although various efforts have been made to avoid this problem, achromatic imaging based on metasurfaces at visible wavelengths is still not available. Thus, it would be an advance if these and other limitations of the current state of the art could be overcome.

BRIEF SUMMARY OF THE INVENTION

In one aspect, the present invention provides dielectric metasurface optical elements with spatially multiplexed phase profiles. The optical elements can improve performance of conventional optical elements and facilitate the creation of entirely new functionalities. The interleaved metasurface optical elements achieve high packing density of distinct optical elements on a surface. Such elements may be fabricated as a unique type of dielectric gradient metasurface optical element (DGMOE). The design of such an element includes selection of phase profiles of multiple desired optical elements. The selected profiles are broken up in a large number of segments. These segments are then spatially multiplexed with equal area/weight of each optical sub-element. By interleaving multiple optical element phase profiles and using the resulting profile to fabricate a DGMOE element, multifunctional wavefront shaping can be accomplished within one element, without reducing the numerical aperture of each sub-element.

Embodiments include various multi-functional optical elements, including an axial and lateral multi-foci metasurface lens and a DGMOE lens that operates for any state of polarized light. Methods to suppress undesired diffractive effects associated with different choices of spatial multiplexing are also investigated. For example, we compared randomized tangential offsets of the segments of different DGMOEs and random placement of square segments in a checkerboard pattern. Interleaved segment sizes down to 600 nm×600 nm are demonstrated, which is useful to make sophisticated, multifunction phase profiles that are difficult or impossible to achieve with conventional optical elements, including conventional diffractive optical components.

Key features of optical elements according to embodiments of the present invention include, optical multifunctionality in a single ultrathin optical element, DGMOE that operates for any state of polarization, improved control over aberrations (e.g. chromatic), high numerical aperture optics, lightweight optical elements, fabrication without the use of gray scale lithography, short focal length optical elements due to small physical size of phase elements, allows use of relatively strongly absorbing materials due to low element thickness, and multiple interleaved optics in the same area each maintaining the spatial resolution afforded by the entire optical area.

In one aspect, the invention provides a metasurface optical device having a layer of nanoscale metasurface optical antenna elements deposited on a substrate layer and arranged with spatially varying characteristics in the plane of the device such that the optical device has a spatially varying optical phase response capable of optical wavefront shaping. The spatially varying optical phase response is a spatial interleaving of multiple distinct phase profiles corresponding to multiple optical sub-elements, thereby providing multifunctional wavefront shaping. The layer of nanoscale metasurface optical antenna elements may be composed of dielectric materials, high-index semiconductor material, or insulator-and-metal materials. For example, The layer of nanoscale metasurface optical antenna elements may be a dielectric gradient metasurface optical element. The optical antenna elements may be implemented by nanobeams, nanofins, ellipse nanoparticles, or circular nanoparticles. The optical antenna elements may be arranged in the plane of the device with spatially varying orientation, shape, or size to realize the spatially varying optical phase response. The layer of nanoscale metasurface optical antenna elements preferably has a thickness between 10% and 150% of a predetermined operational wavelength of the device, and the optical antenna elements are preferably nanobeam antennas arranged with separations less than a predetermined operational wavelength of the device. The spatial interleaving is preferably, but not necessarily, such that each of the multiple distinct phase profiles is associated with an equal area.

In contrast with existing technologies that use diffractive optical elements (DOE) to implement interleaved phase profile, the present invention demonstrates ultrathin, single height optical elements. These optical elements have various advantages, including interleaved optical metasurface elements that can perform a large number of combined or separate optical functions per unit area while retaining positive performance aspects to associated with large area optical elements; the phase profiles of multiple lenses can be broken up and interleaved together equally but randomly spanning an entire optical aperture. This would maintain the high spatial resolution afforded by the aperture of the optical area while enabling the function of each lens at the cost of reducing the light gathering power of each lens; the optical components are ultrathin, have small footprint, are lightweight, use very little material can be easily integrated; the phase profile of wavefront coded phase plate can be easily added into the design of metalens; aberrations can be reduced.

Spatial multiplexing as taught in the present invention can also provide performance increases over existing optical elements. The use of spatial multiplexing can achieve a performance associated with large area optical elements while enabling a large packing density of optical functions. For example, it can provide high resolution lenses with large numerical aperture, high angular selectivity with small area per lens. Flat lenses with reduced optical aberrations or broadband operation can also be realized.

BRIEF DESCRIPTION OF THE SEVERAL VIEWS OF THE DRAWINGS

FIG. 5A shows the phase profile of a single full lens used to illustrate the design of a polarization-independent metasurface optical element, according to an embodiment of the invention.

FIG. 5B shows the phase profile of the union of two half-lenses used to illustrate the design of a polarization-independent metasurface optical element, according to an embodiment of the invention.

FIG. 5C shows the phase profile of the union of two lenses divided into eight sectors used to illustrate the design of a polarization-independent metasurface optical element, according to an embodiment of the invention.

FIG. 5D shows the phase profile of the two lenses spatially multiplexed randomly used to illustrate the design of a polarization-independent metasurface optical element, according to an embodiment of the invention.

FIG. 5E is a calculated amplitude distribution of the diffraction pattern for the phase profile of FIG. 5A.

FIG. 5F is a calculated amplitude distribution of the diffraction pattern for the phase profile of FIG. 5B.

FIG. 5G is a calculated amplitude distribution of the diffraction pattern for the phase profile of FIG. 5C.

FIG. 5H is a calculated amplitude distribution of the diffraction pattern for the phase profile of FIG. 5D.

The spatially interleaved structure of metasurface lens was shown in FIG. 6E.

FIGS. 6A, 6B show the nanostructures of two full metasurface lenses that focus onto a focal plane incident light having left and right circular polarization, respectively, according to an embodiment of the invention.

FIGS. 6C, 6D show the lenses of FIGS. 6A, 6B as divided into randomly selected segments, according to an embodiment of the invention.

FIG. 6E shows the spatially interleaved structure of a polarization independent metasurface lens formed by the combination of the distributions of FIGS. 6C, 6D, according to an embodiment of the invention.

Figure 7:
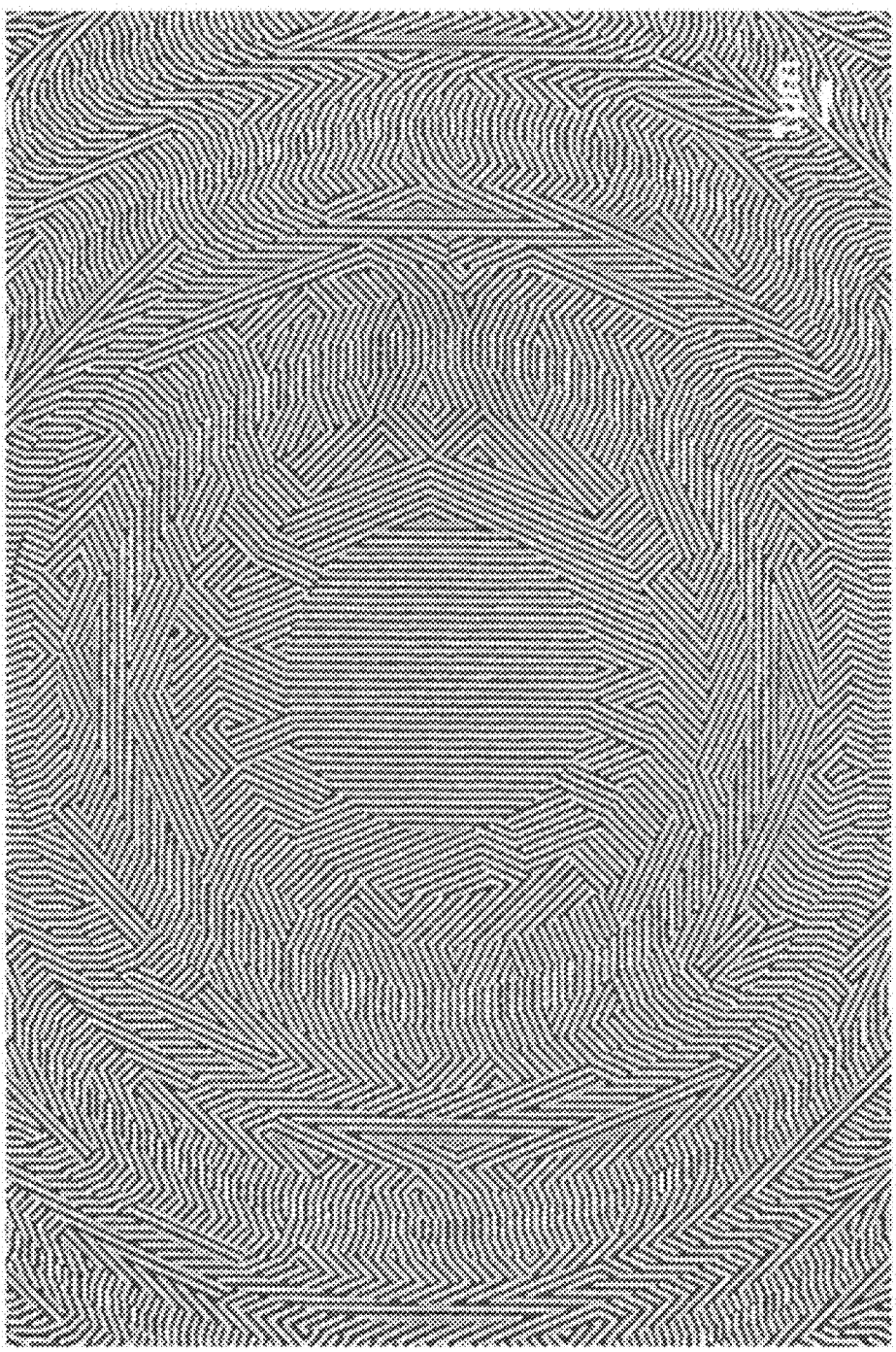

FIG. 7 shows a scanning electron microscope image of the fabricated polarization-independent metasurface lens of FIG. 6E.

DETAILED DESCRIPTION OF THE INVENTION

Embodiments of the present invention provide interleaved metasurface optical elements that realize multiple distinct optical functions on a single surface.

According to the principles of the invention, the phase profiles of multiple desired optical sub-elements are spatially divided into a large number of segments which are then interleaved, preferably with equal area/weight of each optical sub-element, to create spatial multiplexing of the phase profiles. By interleaving phase profiles of multiple optical sub-elements, multifunctional wavefront shaping is realized within one element, without reducing the numerical aperture of each sub-element. As examples, several specific embodiments of such multi-functional optical elements are described in detail below, including an axial multi-foci metasurface lens, lateral multi-foci metasurface lens, and polarization independent metasurface lens.

Figure 1A:
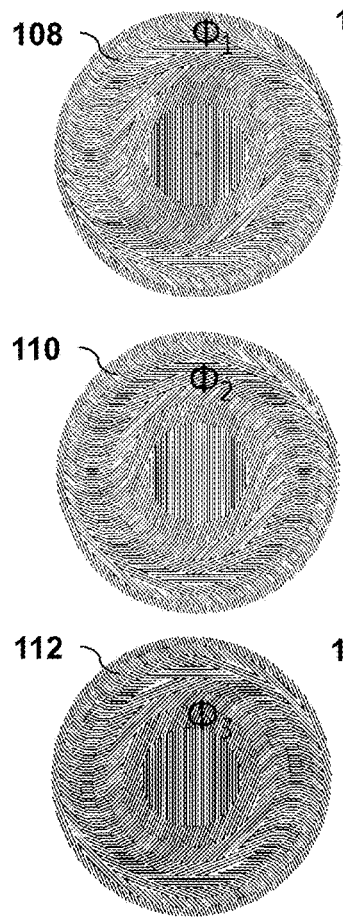
FIG. 1A illustrates three metasurface optical elements used to illustrate the design of a multi-focus metasurface optical element that focuses distinct wavelengths at the same point, according to an embodiment of the invention.
Figure 1B:
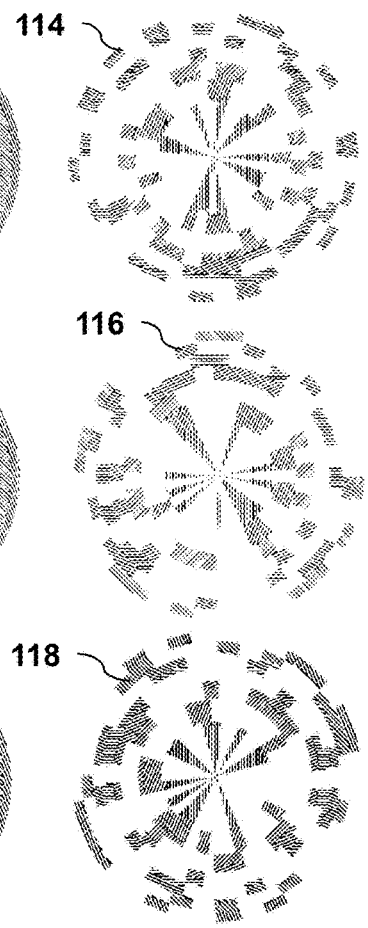
FIG. 1B illustrates, for each of the metalenses of FIG. 1A, randomly selected segments of metasurface optical elements used to illustrate the design of a multi-focus metasurface optical element that focuses distinct wavelengths at the same point, according to an embodiment of the invention.
Figure 1C:
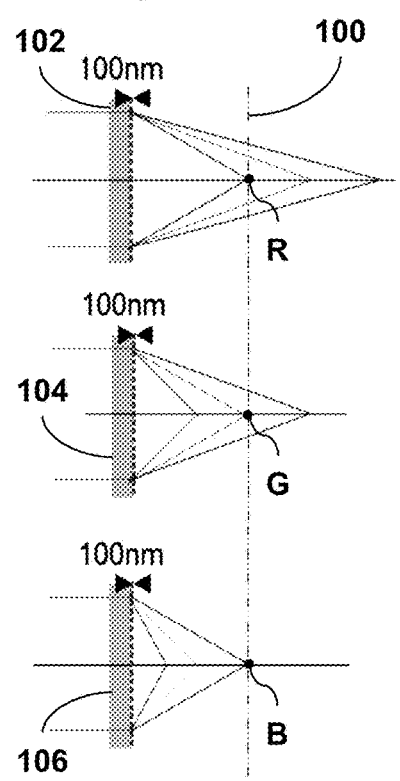
FIG. 1C illustrates three metalenses used to illustrate the design of a multi-focus metasurface optical element that focuses distinct wavelengths at the same point, according to an embodiment of the invention.

One illustrative embodiment of the invention is a metalens which can focus three red, green, blue (RGB) wavelengths at the same focal point on a common focal plane. The design of such a multifunctional metasurface lens starts by defining three different lenses, with three different focal lengths at the same wavelength. Due to the chromatic diffraction, each single lens will focus different colors at different positions. By optimizing the phase profile of each lens 102, 104, 106, the focal points of red, green and blue (RGB) are designed to coincide at the same point in the same focal plane 100, as shown in FIG. 1C. The phase profiles of the three lenses $\varphi_1$, $\varphi_2$, $\varphi_3$ are as follows:

$$\varphi_1(r) = 20\pi + \frac{2\pi}{\lambda_1}\left(f - \sqrt{r^2 + f^2}\right)$$

$$\varphi_2(r) = 20\pi + \frac{2\pi}{\lambda_2}\left(f - \sqrt{r^2 + f^2}\right)$$

$$\varphi_3(r) = 20\pi + \frac{2\pi}{\lambda_3}\left(f - \sqrt{r^2 + f^2}\right)$$

where f=100 μm is the focal length at $\lambda_1$=480 nm, $\lambda_2$=550 nm, $\lambda_3$=620 nm, and r represents the distance between the local position and the center of the optical elements. The diameter of the lens is about 100 μm, so each single lens has f/1.0.

The designed spatially multiplexed phase profile may be realized by controlling local orientation angles of Si nanowires of 100 nm thickness and 120 nm width deposited on a substrate. By tiling a surface of the substrate with half-waveplates with their fast-axes orientations according to a function θ(x,y), an incident circular polarized light beam will be fully transformed to a beam of opposite helicity and imprinted with a geometric phase equal to $\varphi_g(x,y)=\pm 2\theta(x,y)$. By controlling the local orientation of the fast-axes of the waveplate elements between 0 and π, phase pickups can be achieved that cover the full 0-2π range while maintaining equal transmission amplitude for the entire optical component. The three lenses 102, 104, 106 in this design would be realized as metaphase optical elements 108, 110, 112, as shown in FIG. 1A.

Figure 1D:
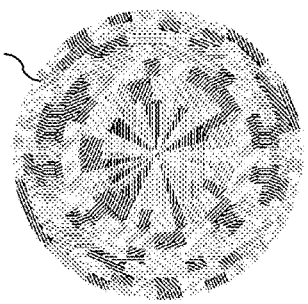
FIG. 1D illustrates a multifunctional metasurface optical element that focuses distinct wavelengths at the same point, according to an embodiment of the invention.

The optical functions of three lenses are combined into one metasurface by interleaving the sub-elements according to the phase profiles of the three lenses. Specifically, one third of the surface area of each metalens 108, 110, 112 is randomly selected to implement the phase profile of each single lens, resulting in the metalenses 114, 116, 118, as shown in FIG. 1B. In this example, the area is divided into sub-areas (i.e., segments) radially across and along the phase ring. The lens is thus divided into randomized tangential offsets of the segments. Each of the divided segments is selected to implement the phase profile of one of the three optical elements. The selection is preferably random in order to suppress the diffraction due to interference from periodic pattern. At the same time, preferably the numbers of segments of three lens within each phase ring are equal, so that three lenses share equal area within each phase ring. The interleaved resulting multifunctional metasurface lens 120 is shown in FIG. 1D.

Figure 2:
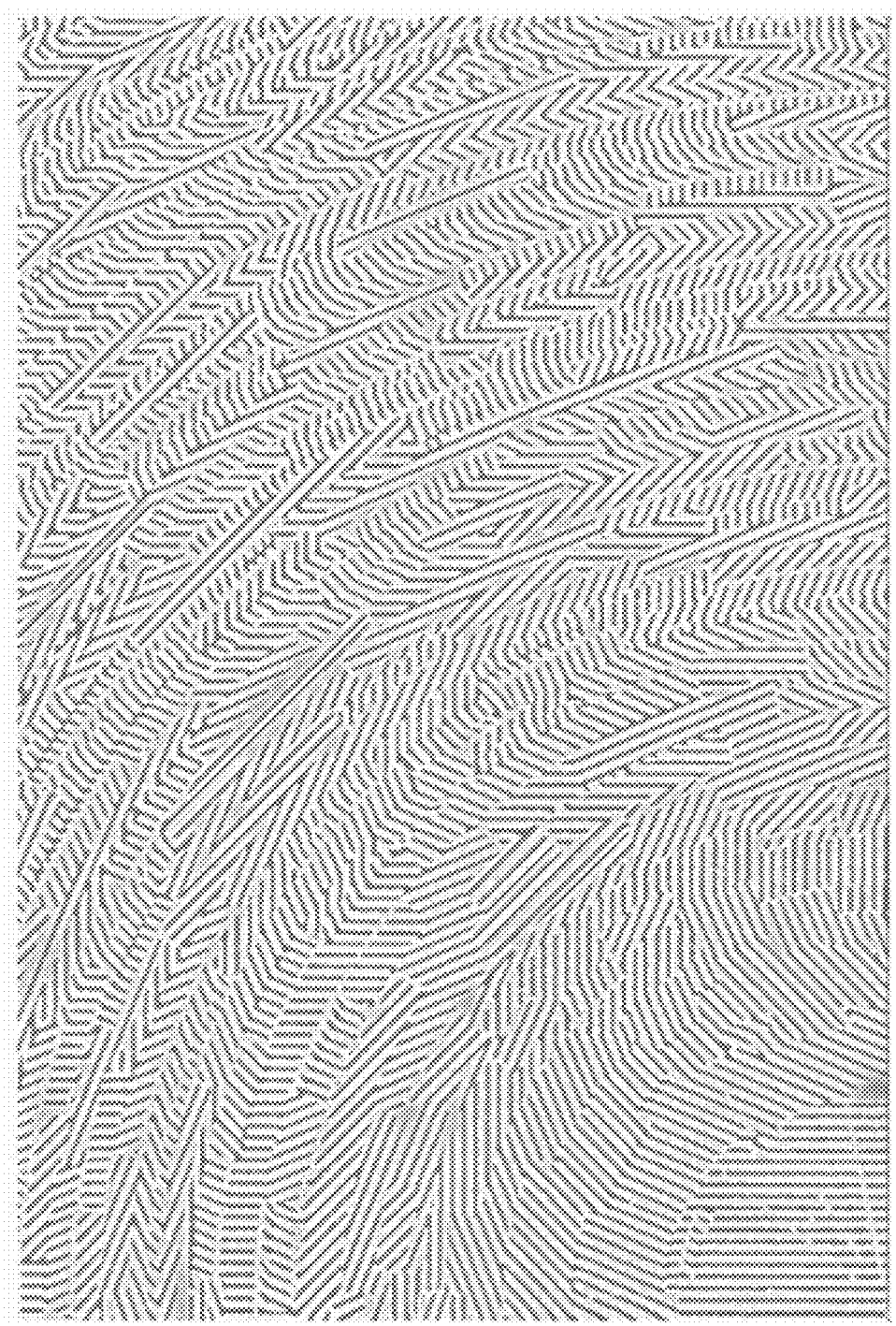
FIG. 2 is a scanning electron microscope image of a portion of the fabricated multifunctional metasurface lens of FIG. 1D comprised of thousands of Si nanobeam antennas with subwavelength spacing and space-varying orientations, according to an embodiment of the invention.

The designed multifunctional metasurface may be fabricated using nanopatterning techniques such as those described in U.S. Pat. No. 9,507,064 entitled "Dielectric Metasurface Optical Elements" which is incorporated herein by reference. The fabrication of dielectric metasurface begins with the deposition of a 100 nm-thin poly-silicon film onto a quartz substrate using a low-pressure chemical vapor deposition (LPCVD). The patterning of Si nanowire arrays is defined by E-beam lithography and followed by standard reactive-ion etching (HBr/Cl$_2$). FIG. 2 shows a scanning electron microscope image of the fabricated multifunctional metasurface lens comprised of thousands of Si nanobeam antennas with subwavelength spacing and space-varying orientations. FIG. 2 is a scanning electron microscope image of a portion of such a multifunctional metasurface lens.

When illuminated with a normally-incident light beam with left circular polarization (LCP), the multifunctional metasurface is capable of focusing the light into three focal points along propagation axis. The intensity distribution of the light transmitted through the metasurface is measured using a confocal microscope. The intensity profiles have three focal spots for each single wavelength illumination, and all the three colors have one shared focal plane at distance of 100 μm. It will generate an achromatic focal spot on the designed plane, and thus can be used to correct chromatic aberration and making an achromatic metasurface.

The focal spots of multifunctional metalens have a spot size that is equal to that of a single lens. As a result of the multiplexing methods, the diameter of each sub-lens within multifunctional metalens is equal to that of a single lens, thus the metalens has the same numerical aperture as the single full lens. Therefore, the multiplexed multifunctional metalens shows enhanced numerical aperture compared to those spatially separated multifunctional optical elements. In addition it has the advantage of adding multi-functionalities without compromising resolution.

Figure 3:
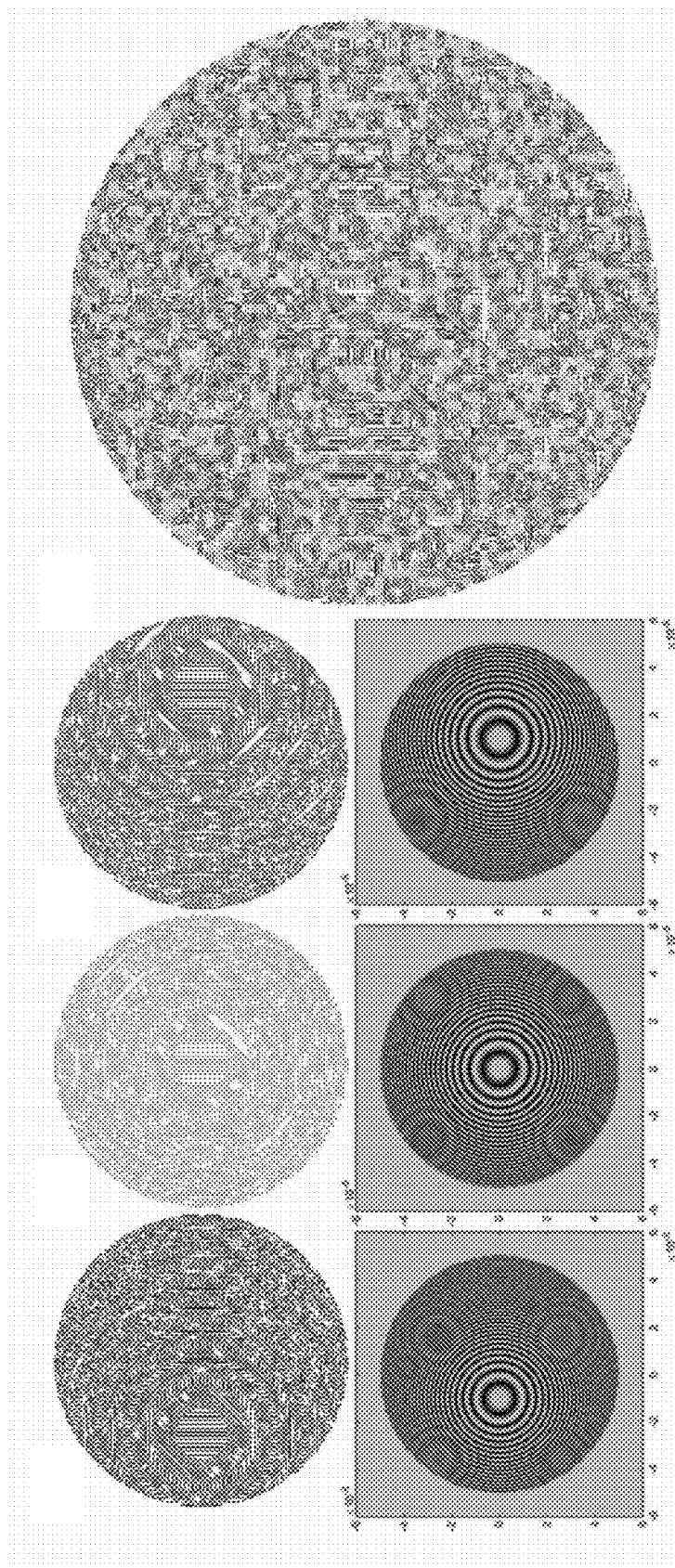
FIGS. 3A, 3B, 3C show metasurface designs of three optical elements to be combined to produce a multifunctional metasurface optical element that focuses different wavelengths at different transverse focal points in the same plane, according to an embodiment of the invention.
FIGS. 3D, 3E, 3F are graphs of phase profiles for the metasurface designs of FIGS. 3A, 3B, 3C, respectively.
FIG. 3G shows the design of multiplexed metalens with lateral multi-foci, incorporating the three lenses.

In another illustrative embodiment of the invention, a multifunctional metalens with lateral multi-foci of different wavelengths is provided. FIGS. 3A, 3B, 3C show the metasurface designs of three optical elements to be combined, and their corresponding phase profiles are graphed in FIGS. 3D, 3E, 3F. In order to focus and steer light at the same time, the phase profiles of the optical elements are designed as off-axis lenses. Each lens focuses one of three RGB wavelengths at one of three different lateral spots on the focal plane, having phase profiles of $\varphi_1$, $\varphi_2$, $\varphi_3$ as follows:

$$\varphi_1(r) = 20\pi + \frac{2\pi}{\lambda_1}\left(f - \sqrt{(r+d)^2 + f^2}\right)$$

$$\varphi_2(r) = 20\pi + \frac{2\pi}{\lambda_2}\left(f - \sqrt{r^2 + f^2}\right)$$

$$\varphi_3(r) = 20\pi + \frac{2\pi}{\lambda_3}\left(f - \sqrt{(r-d)^2 + f^2}\right)$$

where d=10 μm is distances between focal spots of different colors in lateral direction, and f=100 μm is focal length at $\lambda_1$=480 nm, $\lambda_2$=550 nm, $\lambda_3$=620 nm. The diameter of the lens is about 100 μm, so each single lens has f/1.0.

A different strategy of spatial multiplexing is employed in this design. Instead of randomized tangential offsets of the segments, the lens is divided into random placement of square segments in a checkerboard pattern. FIG. 3G shows the design of multiplexed metalens with lateral multi-foci, incorporating the three lenses.

Figure 4:
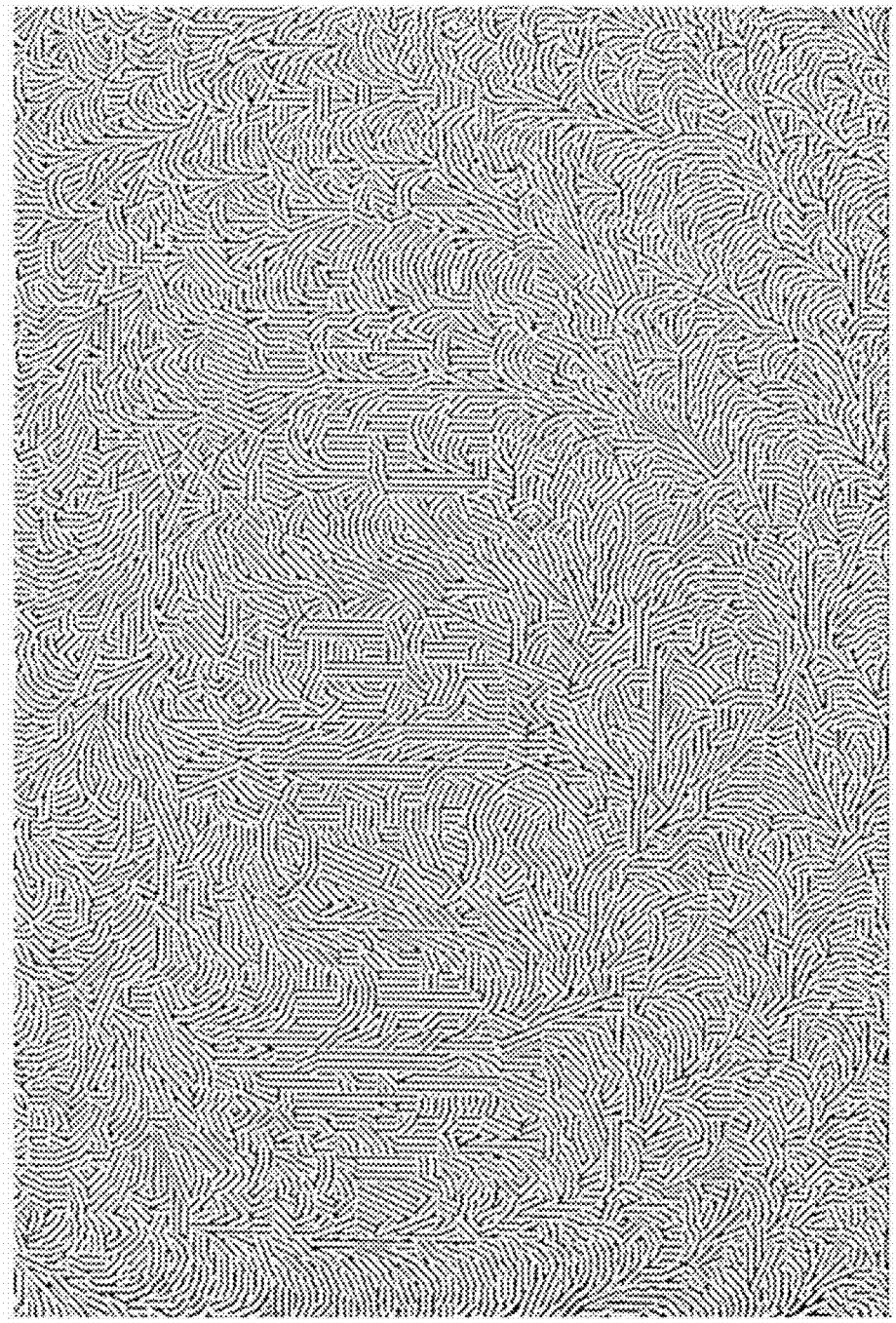
FIG. 4 shows a SEM of a portion of a fabricated metalens realizing the multifunctional metasurface shown in FIG. 3G.

FIG. 4 shows the SEM of fabricated metalens with lateral multi-foci. The metalens with interleaved segment sizes down to 600 nm×600 nm were demonstrated, which is useful to make sophisticated, multifunction phase profiles that are difficult or impossible to achieve with conventional optical elements, including conventional diffractive optical components.

When illuminated with a monochromatic collimated Gaussian beam with left circular polarization (LCP), the metalens is capable of focusing the light into three focal spots with different locations in both lateral and axial direction. When illuminated with three colors at the same time, the metalens is capable of focusing the three colors into three focal spots at the same focal plane, but separated in lateral direction, as designed. Again, the designed multi-functional metalens has enhanced numerical aperture thanks to multiplexing methods.

In another illustrative embodiment of the invention, a polarization independent metasurface lens is provided which can manipulate incident light with random polarization. The multifunctional metasurface optical element is designed as an interleaving of profiles for two metasurfaces which are spatially multiplexed to realize the desired optical function.

FIGS. 5A-5H illustrates the design principle of polarization independent metasurface lens. To help illustrate the principle, the evolution from a metasurface of single full lens to a multiplexed metasurface of two distinct lenses is shown. A DGMOE with the paraboloidal phase profile can focus light into a diffraction limited focal spot. The phase profile of a single full lens, as shown in FIG. 5A, will focus light of LCP on the focal plane of 550 μm away in the transmission side. The diffraction pattern at the focal length distance is calculated based on the Fresnel approximation. The calculated amplitude distribution of the diffraction pattern is shown in FIG. 5E. For the same metasurface nanostructure of DGMOE, incident with opposite circular polarizations will result in opposite phase profile. When the light of opposite helicity RCP incident on it, it will generate a diverging beam. Therefore, the structure of metasurface lens which can concentrate light with RCP is horizontally reversed/mirror-imaged to the metasurface for concentrating LCP.

In order to design a DGMOE lens which can take randomly polarized light into focus, the single lens design can be divided in half, assigning each half the phase profile to a corresponding polarization and then join the halves together, as shown in FIG. 5B. The two segments have opposite phase, and each half of the lens has the phase profile that can focus light of one polarization in the transmission side. Each half of lens will focus light of opposite polarization onto the focal plane. Because only half of the area/aperture is involved in focusing the light, the maximum intensity of focal spot will drop to a quarter of a full lens, due to the reduced area that is involved in interference. The calculated amplitude distribution of the diffraction pattern is shown in FIG. 5F.

When the lens design is divided into more segments by radial cuts as shown in FIG. 5C, its focal spot is smaller and more homogeneous. However, due to the periodic arrangement of segments, there are higher diffraction orders shown in the focal plane, as shown in FIG. 5G.

When the two lenses are spatially interleaved with random spatial multiplexing, as shown in FIG. 5D the structure creates a focal spot with diameter as small as a full lens. The random multiplexing suppress the higher diffraction order. FIG. 5H shows the corresponding amplitude distribution of diffraction pattern at the focal plane. The amplitude is normalized to the maximum intensity of each focal spot.

Therefore, by multiplexing, the optical function of two distinct optical elements is implemented in a single flat optical metasurface element. The phase profiles are given as follows:

$$\varphi_1(x, y) = 20\pi + \frac{2\pi}{\lambda}(f - \sqrt{x^2 + y^2 + f^2})$$

-continued $$\varphi_2(x, y) = -20\pi - \frac{2\pi}{\lambda}(f - \sqrt{x^2 + y^2 + f^2})$$

where focal length f=550 μm, and wavelength $\lambda_1$=550 μm. The lens has diameter of 100 μm. (The focal length of 550 μm is chosen for illustrative purposes, so that the phase profile changes slowly along radius and therefore multiplexing segments stand out.)

We experimentally demonstrated the design on DGMOE using thousands of Si nanobeam antennas with subwavelength spacing and space-varying orientations.

The problem of reduced numerical aperture and non-homogenous beam in half lens is solved by random spatial multiplexing of two distinct lenses for opposite polarization, which is illustrated in FIG. 5D. FIGS. 6A, 6B, 6C, 6D, 6E show the schematic of random spatial multiplexing when designing the nanopattern of a polarization independent metasurface based on DGMOE.

The design starts with the two lens implemented on DGMOE with focal length of 100 μm (@λ=550 nm). FIGS. 6A, 6B show the nanostructures of two full metasurface lenses, which can focus light with LCP and RCP onto focal plane, respectively. They are mirror symmetric, with opposite phase profiles.

For the spatial multiplexing of radially symmetric lens, the lens is divided into segments by radially symmetric cut into 32 pieces and also along the rings. FIGS. 6C, 6D show the lenses as divided into randomized tangential offsets of segments, where half of each single lens is selected. Half of the segments are randomly selected and assigned to lens LCP, and the other half of the area is assigned to lens RCP. And then the two parts are put together. The spatially interleaved structure of metasurface lens was shown in FIG. 6E.

The designed metalens of FIG. 6E may be fabricated by E-beam lithography. When illuminated with plane wave of LCP at wavelength of 550 nm, the measurement of light spot on the focal plane shows a symmetric circular focal spot. The diameter of the focal spot is the same in all direction, which means that the numerical aperture is equal in all direction. FIG. 7 shows a scanning electron microscope image of the fabricated polarization-independent metasurface lens.

The focal spot is symmetric along all directions when propagating along the optical axis, which means light is contributed from all direction. When the incident light is RCP, the focal spot has the same light intensity distribution as LCP. When incident light with linear polarization is incident on metasurface, the focal spot has the same diameter as that of LCP. Therefore, the optical function of the interleaved metasurface lens is independent of the polarization of incident light. By random spatially interleaving, the structure maintain the numerical aperture of the original full lens, and therefore the resolution of focal spot. The maximum intensity of focal spot of interleaved metasurface is a quarter of that of a full lens of metasurface. For incident light with random polarization, it can always be considered as the superposition of RCP and LCP.

In conclusion, embodiments of the invention provide a multifunctional metasurface optical element based on random spatial multiplexing of multiple distinct phase profiles corresponding to multiple distinct optical sub-elements. Although the principles of the invention have been described through several specific embodiments for the purposes of illustration, it will be appreciated by skilled practitioners in light of this description that the principles of the invention are not limited to the specific examples described herein. Generally, following the same design principles, any number of distinct phase profiles can be spatially multiplexed to realize a single multifunctional metasurface optical element using dielectric gradient metasurface technologies. The phase profile design can be applied to other (e.g., metallic) metasurfaces as well. The design principle can be applied across a wide range of frequencies, such as EUV, UV, VIS, NIR, IR, LWIR.

The optical antenna elements can be of various different types within the same device, designed to manipulate light of different wavelengths and polarizations. They may be implemented as geometric phase and Si nanobeam antennas, as described in the embodiments. Alternatively, other types of metasurfaces may also be used to implement multifunctional optical elements according to the principles of the invention, including various methods of phase tuning (e.g., geometric phase by rotating the orientation nanostructures, effective refractive index by tuning the size of nanostructures), different materials (e.g., high-index semiconductor or insulator and metal), and different antenna design (e.g., nanobeam, nanofin, ellipse nanoparticle, circular nanoparticle). In addition, the phase profile can be implemented using phase plate optical elements (e.g., diffractive optical elements and liquid crystal lenses).

The optical sub-elements within a single multifunctional optical element can have different optical functions of the same type (e.g., lens, axicon, diffraction grating) or of different mixed types (e.g., a lens sub-element and a diffraction grating). Also, the sub-elements may have the same or different optical axes. The number of sub-elements N in a single device is at least two but has no upper bound. Because the intensity of the generated image is inversely proportional to $N^2$, however, it is preferable that N is less than 100.

The interleaving of the phase profiles is preferably random (i.e., non-periodic). In general, a higher degree of randomness in the selection of segments to exchange is preferable. In addition, a higher degree of interleaving of segments is preferable (e.g., exchanging at least majority of segments of a phase profile with segments of other phase profiles).

The minimum size of each segment is determined by the size of the nanoscale optical antenna elements. Preferably, each segment is large enough to contain at least one nanoscale optical antenna element. In addition, the segment size should be less than the minimum operational wavelength of the device in order to prevent diffraction effects from occurring.

Embodiments of the invention have many applications and provide improvements to existing applications. These include flat lenses with unique, polarization-dependent optical functions; compact imaging systems, enable new medical systems and implantable cameras; light field microscopy, light field digital camera, multi-angle stereoscopic image capture, light-field display, multi-angle autostereoscopic displays; rapid patterning (parallel scanning lithography, 3D nanofabrication), high resolution patterning; data storage and readout, such as a parallel DVD or other optical disk write and readout system; beam manipulation optics for VCSEL arrays, modulator arrays, displays, and pixel arrays (e.g. AMOLED), LCDs, detector arrays (e.g. CCD, CMOS); beam shaping, pulse shaping; producing an array of optical traps and applications of these; parallel cell sorting; complex, multicomponent optical systems (e.g. compact optical microscope with a large magnification yet large field of view); very short focal length imaging systems; optical components for wearables, headgear, glasses, and textiles; optical elements proving a unique optical response for use in counterfeiting, credit cards, passports, etc.; micromechanical systems requiring flat optical components. The applications also include optical communications, solar cells, advanced imaging and display systems.

Embodiments of the invention have commercial application in various industries including, for example, optical microscopy, light field digital cameras, wearable devices, display devices, medical imaging, and solar energy harvesting.

The invention claimed is:

1. A metasurface optical device comprising a layer of metasurface optical antenna elements deposited on a substrate layer, wherein the optical antenna elements are composed of nanobeam antennas that serve as optical waveplates arranged with spatial variation of the orientation angles of their fast axes in the plane of the device such that the optical device has a spatially varying optical phase response capable of optical wavefront shaping, wherein the spatially varying optical phase response is a spatial interleaving of multiple distinct phase profiles implemented by spatially dividing each of the multiple distinct phase profiles into randomized segments, and randomly selecting segments from the multiple distinct phase profiles to produce random spatial multiplexing, thereby providing multifunctional wavefront shaping.

2. The metasurface optical device of claim 1 wherein the layer of nanoscale metasurface optical antenna elements is a dielectric gradient metasurface optical element.

3. The metasurface optical device of claim 1 wherein the layer of nanoscale metasurface optical antenna elements is composed of dielectric materials, high-index semiconductor material, or insulator-and-metal materials.

4. The metasurface optical device of claim 1 wherein the optical antenna elements are implemented by nanobeams, nanofins, ellipse nanoparticles, or circular nanoparticles.

5. The metasurface optical device of claim 1 wherein the layer of nanoscale metasurface optical antenna elements has a thickness between 10% and 150% of a predetermined operational wavelength of the device.

6. The metasurface optical device of claim 1 wherein the optical antenna elements are arranged with separations less than a predetermined operational wavelength of the device.

7. The metasurface optical device of claim 1 wherein the spatial interleaving is such that each of the multiple distinct phase profiles is associated with an equal area.

* * * * *